United States Patent
Trozzi

(10) Patent No.: US 7,289,831 B2
(45) Date of Patent: Oct. 30, 2007

(54) ENDLESS POWERED ANYWHERE CELLPHONE SYSTEM

(76) Inventor: Nick Trozzi, 8939 Sylmar Ave., Panorama, CA (US) 91402

( * ) Notice: Subject to any disclaimer, the term of this patent is extended or adjusted under 35 U.S.C. 154(b) by 0 days.

(21) Appl. No.: 11/210,395

(22) Filed: Aug. 24, 2005

(65) Prior Publication Data
US 2007/0049353 A1    Mar. 1, 2007

(51) Int. Cl.
H04Q 7/32 (2006.01)

(52) U.S. Cl. .............. 455/572; 455/574; 455/573; 455/550.1; 455/557; 455/90.3; 455/575.1; 455/403; 379/433.01; 379/433.08; 379/428.01; 320/107; 320/114; 320/108; 320/115

(58) Field of Classification Search ........... 455/572, 455/574, 573, 550.1, 557, 575.1, 90.3, 422.1, 455/403, 500, 517; 379/73, 433.01, 433.08, 379/428.01; 320/107, 114, 108, 113, 115
See application file for complete search history.

(56) References Cited

U.S. PATENT DOCUMENTS 6,384,570 B2 * 5/2002 Matsuyama ............... 320/101
2003/0128010 A1 * 7/2003 Hsu ......................... 320/101
2003/0134668 A1 * 7/2003 Mekuria .................... 455/572
2004/0090210 A1 * 5/2004 Becker et al. .............. 322/1
2004/0204180 A1 * 10/2004 Liao ......................... 455/573
2005/0161079 A1 * 7/2005 Gray ........................ 136/291
2005/0282591 A1 * 12/2005 Shaff ....................... 455/572
2007/0024233 A1 * 2/2007 Ekchian et al. ........... 320/101

FOREIGN PATENT DOCUMENTS

JP    2002351583    * 12/2002

OTHER PUBLICATIONS

1. Emergency Pro 1. T.V. Commercial, Dec. 30, 2006 2. Internet Sites, Dec. 30, 2006.
Energizer (Energi To Go) 1. T.V. Commercial, Sep. 24, 2006 2. Popular Science Magazine Sales Ad, Nov. 2006 3. Internet Web Sites, Sep. 22, 2006.
Sam's Club (Pocket Power) 1. T.V. Commercial, Dec. 16, 2006 2. Internet Sites Dec. 21, 2006.
Cell Phone Charger (Turbo Charger) 1. J.C. Penney Ad, Nov. 4, 2006 2. Internet Sites, Dec. 21, 2006.

* cited by examiner

*Primary Examiner*—Keith Ferguson

(57) ABSTRACT

A cellphone system, cellphone flip or non flip types (10) removable or collapsible hand crank to dynamo (12) external dynamo attachment (14) external solar cell attachment (16) dynamo and solar cell attachment jack (18) solar cells (20) cellphone charging dock (22).

2 Claims, 2 Drawing Sheets

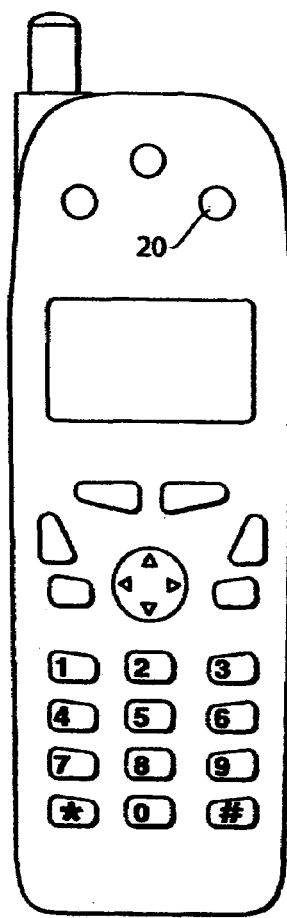
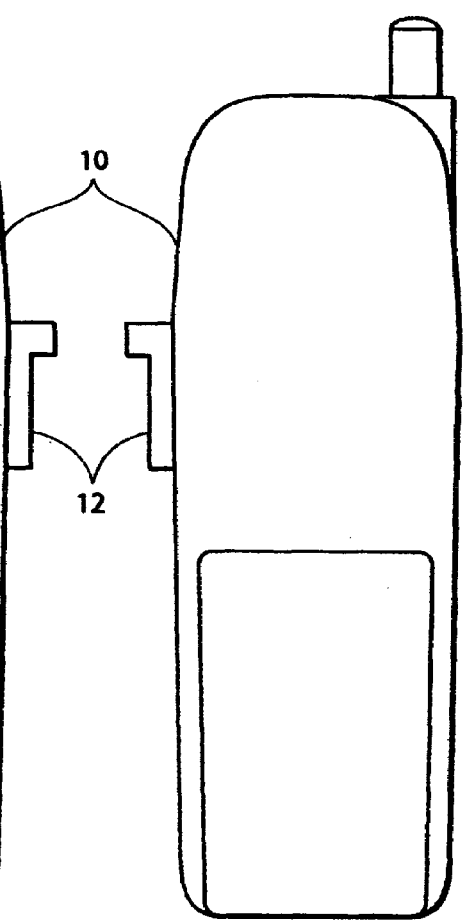
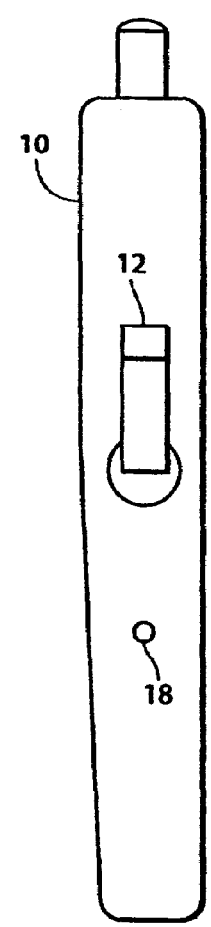
FIG.1A     FIG.1B     FIG.1C
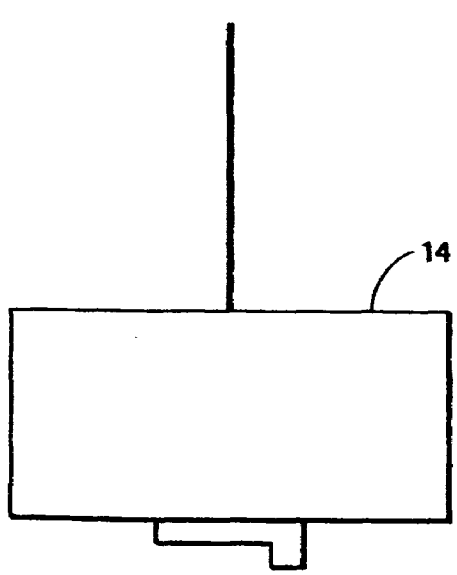
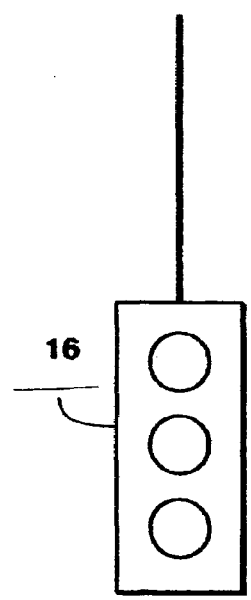
FIG.2     FIG.3

ENDLESS POWERED ANYWHERE CELLPHONE SYSTEM

BACKGROUND OF THIS INVENTION

Field of Invention

This invention relates to cellphones low or No battery power when making a phone call, specifically all cell phones.

All Companies Selling Cellphones Sell Cellphones That Can Lose Power When It Is Most Needed. Over The Years They Have Produced Longer Lasting Batteries, But You Must Keep Remembering To Charge Your Phone All The Time.

Accordingly, besides the objects and advantages of the endless powered anywhere cellphone described in my above patent, several objects and advantages of the present invention are:
(a) to provide a phone call uninterrupted by loss of battery power.
(b) to make charging your cellphone as easy as possible, when you remember, when you are with your charging equipment. Or near your car to plug it in to the lighter.

SUMMARY

In accordance with the present invention cellphone power source, a battery that has to be charged a lot when you remember your phone charger at home.

BRIEF DESCRIPTION OF THE DRAWING

In the drawings, closely related figures have the same number but different alphabetic suffixes.

FIGS. 1A to 1C show a cellphone with a crank to a dynamo generator integrated into the cellphone to produce electrical power any where, also solar cells to collect electrical power. And when needed, especially in emergencies. To make important phone calls without the worry of a dead battery.

FIG. 2 shows a separate dynamo generator that can be plugged into the phone jack on the side of the phone it will work like a internal model, but you can have one or the other. Interenal, or external.

FIG. 3 shows a separate solar cell collector that can be plugged into the phone jack o the side of the phone it will work like the internal model, but you can have one or the other.

DRAWINGS—REFERENCE NUMERALS

Figure 4A:
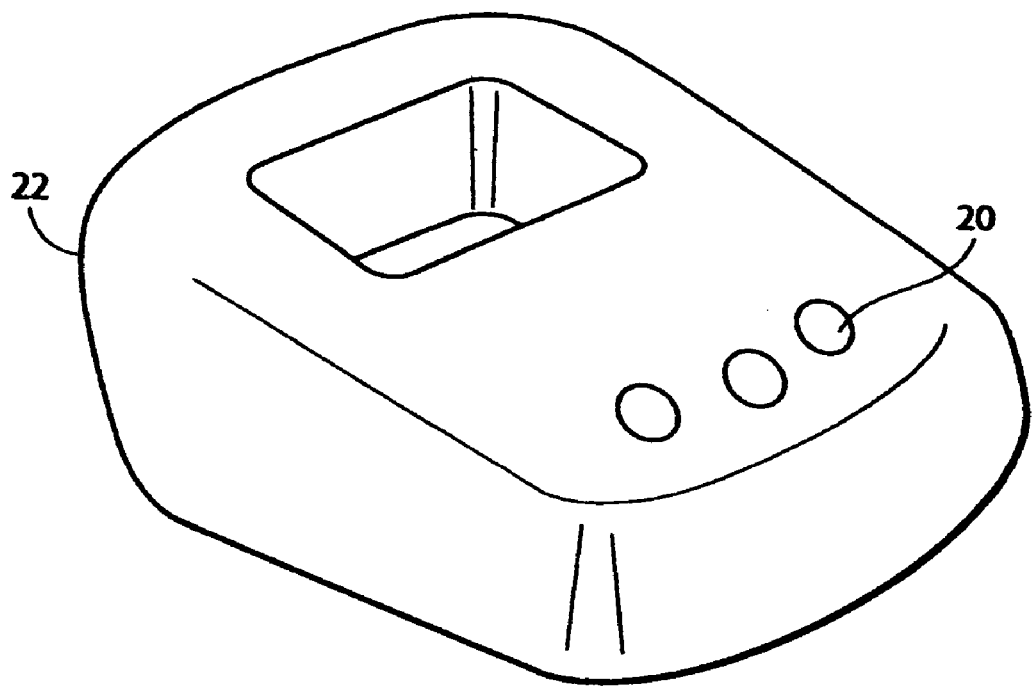
FIGS. 4A and 4B shows a cellphone charger dock, dynamo, solar and attachment jack.
Figure 4B:
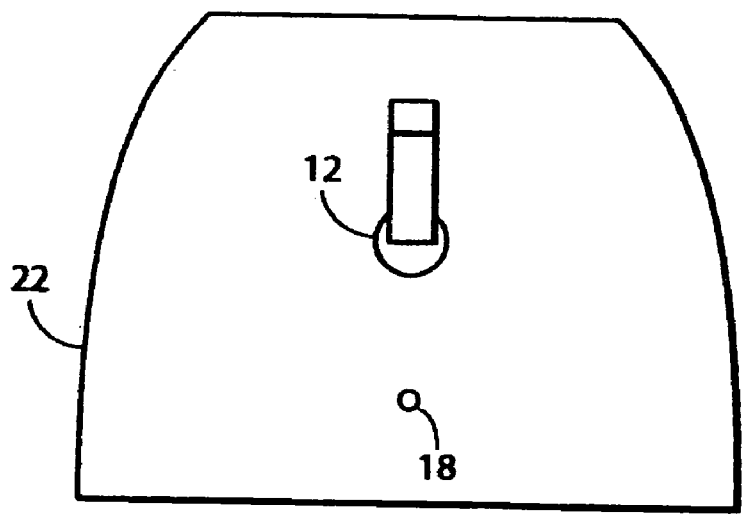

10 cell phone flip or non flip types
12 removable or collapsible hand crank to dynamo
14 external dynamo attachment
16 external solar cell attachment
18 dynamo and solar attachment jack
20 solar cells
22 cellphone charging dock A preferred embodiment of the "Endless Powered Anywhere Cellphone System," is illustrated in FIG. 1A (front view) and FIG. 1B (rear view) 1C (dynamo crank side view) this is the cellphone. The cellphone 10 has a crank 12 to a internal dynamo generator which is integrated with the cellphone charging system, which powers the batteries. Also solar cells 20 are integrated with the cellphone charging system, which powers the batteries. No need for power outlets to charge the cellphone. You can just turn the crank 12 to supply power to the batteries, with the dynamo electrical generator to charge batteries On most days the solar cells 20 can collect enough power to charge the batteries. FIG. 2 (top view) of the dynamo attachment 14 this a external dynamo electrical generator. It will supply the power to the cellphone 10 through the attachment jack 18 on cellphone. FIG. 3 (top view) of the solar cell attachment 16 this is an array, or collection of solar cells, to collect and store solar power to the cellphone 10 batteries. FIGS. 4A and 4B this is a illustration of the mobile cellphone charging dock 22, 4A (is a side view) 4B (rear view) of the charging dock 22. The dock 22 has an array or collection of solar cells 20 integrated into the dock 22, to charges the batteries. Also there is the dynamo electrical generator 12 integrated into the dock 22, to charge the batteries any where. Also the dynamo attachment 14 and solar cell attachment 16 can be plugged into the attachment jack 18 in the rear of the dock 22, to power up the batteries anywhere, with alternative ways of charging the cellphones 10 batteries.

OPERATION—FIGS. 1A, 1B, 1C, 2, 3, 4

The manner of using the endless powered anywhere cellphone system to still use your phone to make calls when the battery power runs down. When you do not have access to any standard charging source. You now have options to recharge your cellphone 10 batteries by either, turning the crank to the dynamo electrical generator 12 to produce current to charge the batteries. Also the solar cell collectors 20 can collect and store power to the batteries, almost any where. As long as you can use a cellphone 10, this is the most convenient way to make sure you will never lose contact. The attachments FIGS. 2 and 3 are external 14,16 and would be connected to the cellphone 10 through a attachment jack 18 on the cellphone 10. They would work like the dynamo 12 and solar power 20 integrated internally into the cellphone to power batteries. FIG. 4 the cellphone 10 charging dock 22. With the dock 22 you can place your cellphone into the charging dock 22 as you would at present day, with many exceptions including, you do not need a electric outlets to plug into to get current to your cellphone 10 batteries. You could use the internally integrated dynamo 12 or solar cells 20. Or plug in external dynamo 14 solar cells 16 attachments to the charging dock 22 attachment jack 18, to charge your depleted battery power energy source.

CONCLUSION, RAMIFICATIONS, AND SCOPE

Accordingly, the reader will see that the endless power anywhere cellphone system will make one of the most annoying problems of a cellphone no longer a problem. Low power or no power will be a thing of the past.

It allows you the power to charge your cellphone any where.

It allows you to not have to be close to a electrical outlet to use the cellphone.

It allows you to use it with flip and non flip cellphones of all types. Made for the certain cellphones.

It permits the owner of the system not to have no anxiety about lossing service because of no power.

Although the description above contains specifities, these should not be construed as limiting the scope of the invention but merely providing illustrations of some of the presently preferred embodiments of this invention. For example there could be other shapes and descriptions of the invention above.

Thus the scope of the invention should be determined by the claim rather than example.

I claim:

1. A cellphone system, comprising: a cellphone and a cellphone charging dock; internally inside said cellphone is a removable or collapsible crank dynamo electric generator and a solar cell collector array to charge cellphone batteries, anytime, anywhere; internally inside said cellphone charging dock is a removable or callapsible crank dynamo electric generator and a solar call collector to charge cellphone batteries within said cellphone, anytime, anywhere;and a dynamo and solar attachment jack within said cellphone for attachment of said cellphone charging dock to charge said cellphone batteries, anywhere,anytime.

2. The cellphone system of claim 1, wherein said cellphone and cellphone charging dock, and other component has a dynamo electric generator and a solar cell collector array internally integrated into said cellphone and said cellphone charging dock, or as a external attachment to charge said cellphone batteries on the go, anywhere, at anytime.

* * * * *